(12) United States Patent
Xie et al.

(10) Patent No.: US 10,331,280 B2
(45) Date of Patent: Jun. 25, 2019

(54) TOUCH SUBSTRATE, MANUFACTURING METHOD THEREOF, AND DISPLAY DEVICE

(71) Applicants: BOE TECHNOLOGY GROUP CO., LTD., Beijing (CN); HEFEI XINSHENG OPTOELECTRONICS TECHNOLOGY CO., LTD., Hefei, Anhui (CN)

(72) Inventors: Xiaodong Xie, Beijing (CN); Ming Hu, Beijing (CN); Ting Zeng, Beijing (CN); Qingpu Wang, Beijing (CN); Jing Wang, Beijing (CN)

(73) Assignees: BOE TECHNOLOGY GROUP CO., LTD., Beijing (CN); HEFEI XINSHENG OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 296 days.

(21) Appl. No.: 15/159,217

(22) Filed: May 19, 2016

(65) Prior Publication Data
US 2017/0068353 A1 Mar. 9, 2017

(30) Foreign Application Priority Data
Sep. 6, 2015 (CN) .......................... 2015 1 0561374

(51) Int. Cl.
*G06F 3/044* (2006.01)

(52) U.S. Cl.
CPC .... *G06F 3/044* (2013.01); *G06F 2203/04103* (2013.01)

(58) Field of Classification Search
None
See application file for complete search history.

(56) References Cited

U.S. PATENT DOCUMENTS

| | | | |
|---|---|---|---|
| 2010/0265206 A1* | 10/2010 | Chen | G06F 3/0412 345/174 |
| 2011/0025639 A1* | 2/2011 | Trend | G06F 3/044 345/174 |
| 2011/0157079 A1* | 6/2011 | Wu | G06F 3/044 345/174 |
| 2011/0290631 A1* | 12/2011 | Kuriki | G06F 3/044 200/600 |
| 2015/0062457 A1* | 3/2015 | Kida | G06F 3/044 349/12 |

* cited by examiner

*Primary Examiner* — Carl Adams
(74) *Attorney, Agent, or Firm* — Nath, Goldberg & Meyer; Joshua B. Goldberg

(57) ABSTRACT

The present invention provides a touch substrate, a manufacturing method thereof, and a display device. In the touch substrate of the present invention, first leads of a first-layer structure are connected with first patterns in a second-layer structure via first via holes, second leads of the first-layer structure are connected with second patterns in the second-layer structure via second via holes, and the first patterns and the second patterns produce mutual capacitance. Each first pattern comprises a plurality of branches radiating from the center to the circumference, each second pattern surrounds one first pattern in a mutually separated manner, and when the touch substrate is used for flexible display, the second patterns can cover the whole bent surface, so that when a user touches any place of the touch substrate, the touch substrate can quickly respond and blind spots cannot be formed.

18 Claims, 1 Drawing Sheet

TOUCH SUBSTRATE, MANUFACTURING METHOD THEREOF, AND DISPLAY DEVICE

FIELD OF THE INVENTION

The present invention belongs to the field of display technology, and specifically relates to a touch substrate, a manufacturing method thereof, and a display device.

BACKGROUND OF THE INVENTION

At present, electronic devices such as mobile phones, pads, notebooks and the like have started using touch screens. Capacitive touch screens have drawn more and more attention due to the advantages of accurate and sensitive positioning, good touch handfed, long service life and the like. The capacitive touch screens can be divided into mutual capacitive touch screens and self-capacitive touch screens, wherein the mutual capacitive touch screens have become the mainstream of touch screen markets and the trend of future development because multi-point touch can be achieved thereby.

Touch sensing layers of the capacitive touch screens may be made of many materials, wherein ITO is used a lot and has a great application market in the display field with the characteristics of high transmittance and excellent conductive performance. However, the metallic indium in the ITO material is expensive and lacking, and the ITO has the characteristics of being crisp, unlikely to bend and the like, so that the ITO is subjected to sonic limitations in the fields of flexible display and the like.

In view of the above limitations, the prior art has proposed substituting graphene for the ITO material to manufacture electrodes. However, the structures of the electrodes made of the graphene are the same as those of ITO and are mostly used for flat panel displays, and if the structures are used for flexible display and bent panels, touch blind spots are easily produced at the bent positions, so that the sensitivity of flexible display is reduced. Accordingly, the design of manufacturing electrodes with graphene in the prior art is not suitable for flexible display.

Thus, how to improve the electrodes made of graphene material so as to be suitable for flexible display panels has become a problem to be solved urgently.

SUMMARY OF THE INVENTION

The present invention provides a touch substrate, a manufacturing method thereof, and a display device in view of the problems that when the structure of the existing graphene electrode is used for a bent panel, touch blind spots are easily generated and the structure is not suitable for flexible display.

Technical solutions adopted for solving the technical problems of the present invention are as follows:

A touch substrate, which includes:
a base;
a first-layer structure arranged on the base, wherein the first-layer structure includes first leads and second leads made of graphene, the first leads are used for connecting first signal ends, and the second leads are used for connecting second signal ends;
an insulating layer arranged on the first-layer structure; and
a second-layer structure arranged on the insulating layer, wherein the second-layer structure includes a plurality of touch units made of graphene, each touch unit includes one first pattern and one second pattern, wherein each first pattern includes a plurality of branches radiating from the center to the circumference, and each second pattern surrounds one first pattern in a mutually separated manner;

wherein the insulating layer includes a plurality of via holes, wherein a first via hole is formed at a position corresponding to each first pattern and used for connecting the first pattern with the first lead, and a second via hole is formed at a position corresponding to each second pattern and used for connecting the second pattern with the second lead.

Preferably, the first via holes correspond to the centers of the first patterns.

Preferably, the first signal ends are signal giving ends, and the second signal ends are signal sensing ends.

Preferably, the touch substrate further includes a flat structure made of graphene located in the second-layer structure, wherein the flat structure is located at a position having no first patterns or second patterns and separated from the first patterns and the second patterns.

Preferably, the first leads and the second leads are at least partially arranged in the flat structure of the second-layer structure.

Preferably, each second pattern includes protruding portions surrounding the branches of the first pattern, and at least part of the protruding portions of the second pattern extend between the protruding portions of the second pattern of the touch unit adjacent thereto.

Preferably, the widths of the first leads are within the range of 1 µm-3 µm, and the widths of the second leads are within the range of 1 µm-3 µm.

Preferably, the base is made of a flexible material.

Preferably, the flexible material includes any of polyethylene terephthalate (PET), polystyrene (PS) and polymethyl methacrylate (PMMA).

Preferably, the insulating layer is made of organic carbon.

The present invention further provides a manufacturing method of the above touch substrate, including the following steps:

forming a first-layer structure on a base, wherein the first-layer structure includes first leads and second leads made of graphene, the first leads are used for connecting first signal ends, and the second leads are used for connecting second signal ends;

forming an insulating layer on the first-layer structure;

forming a second-layer structure on the insulating layer, wherein the second-layer structure includes a plurality of touch units made of graphene, each touch unit includes one first pattern and one second pattern, wherein each first pattern includes a plurality of branches radiating from the center to the circumference, and each second pattern surrounds one first pattern in a mutually separated manner;

wherein the insulating layer includes a plurality of via holes, wherein a first via hole is formed at a position corresponding to each first pattern and used for connecting the first pattern with the first lead, and a second via hole is formed at a position corresponding to each second pattern and used for connecting the second pattern with the second lead.

Preferably, the step of forming a first-layer structure further includes: forming first leads and second leads made of graphene by lithography.

Preferably, the step of forming a second-layer structure further includes: forming a plurality of touch units made of graphene by lithography.

The present invention further provides a display device, including the above touch substrate.

As to the graphene of the first-layer structure and the graphene of the second-layer structure, preformed single-layer graphene or double-layer graphene can be transferred to the substrate by using a transfer method, wherein the preformed single-layer graphene or double-layer graphene can be obtained by using various methods, e.g., mechanical separation, oxidation reduction and chemical vapor deposition (CVD).

In the touch substrate of the present invention, the first leads of the first-layer structure are connected with the first patterns in the second-layer structure through the first via holes, the second leads of the first-layer structure are connected with the second patterns in the second-layer structure through the second via holes, and the first patterns and the second patterns produce mutual capacitance. Each first pattern includes a plurality of branches radiating from the center to the circumference, each second pattern surrounds one first pattern in a mutually separated manner, and when the touch substrate is used for flexible display, the second patterns surrounding the plurality of circumferentially radiated branches of the first patterns can cover the whole bent surface, so that when a user touches any place of the touch substrate, the touch substrate can quickly respond and blind spots cannot be formed. The touch substrate of the present invention is suitable for touch screens in various shapes, in particular for curved surface display or vehicle-mounted field or the like.

Reference signs: 1, first-layer structure; 11, first lead; 12, second lead; 2, second-layer structure; 21, first pattern; 22, second pattern; 3, insulating layer; 31, first via hole; 32, second via hole; 4, base; 5, driving IC (Integrated Circuit) chip; 51, first signal end; 52, second signal end.

DETAILED DESCRIPTION OF THE EMBODIMENTS

In order to make those skilled in the art better understand the technical solutions of the present invention, the present invention will be further described in detail below in combination with the accompanying drawings and specific embodiments.

Embodiment 1

This embodiment provides a touch substrate, including:

a base;

a first-layer structure arranged on the base, wherein the first-layer structure includes first leads and second leads made of graphene, the first leads are connected with first signal ends, and the second leads are connected with second signal ends;

an insulating layer arranged on the first-layer structure; and a second-layer structure arranged on the insulating layer, wherein the second-layer structure includes a plurality of touch units made of graphene, each touch unit includes one first pattern and one second pattern., wherein each first pattern includes a plurality of branches radiating from the center to the circumference, and each second pattern surrounds one first pattern in a mutually separated manner;

wherein the insulating layer includes a plurality of via holes, wherein a first via, hole is formed at a position corresponding to each first pattern and used for connecting the first pattern with the first lead, and a second via hole is formed at a position corresponding to each second pattern and used for connecting the second pattern with the second lead.

In the touch substrate of this embodiment, the first leads of the first-layer structure are connected with the first patterns in the second-layer structure through the first via holes, the second leads of the first-layer structure are connected with the second patterns in the second-layer structure through the second via holes, and the first patterns and the second patterns produce mutual capacitance therebetween. Each first pattern includes a plurality of branches radiating from the center to the circumference, each second pattern surrounds one first pattern in a mutually separated manner, and when the touch substrate is used for flexible display, the second patterns surrounding the plurality of circumferentially radiated branches of the first patterns can cover the whole bent surface, so that when a user touches any place of the touch substrate, the touch substrate can quickly respond and blind spots cannot be formed. The touch substrate of the present invention is suitable for touch screens in various shapes, in particular for curved surface display or vehicle-mounted field or the like.

Embodiment 2

Figure 1:
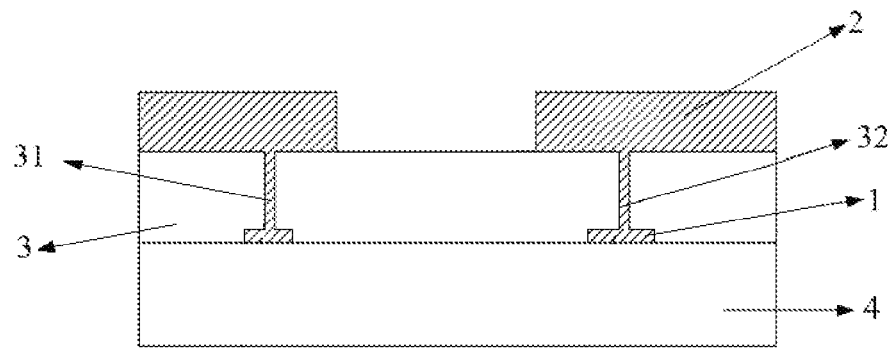
FIG. 1 is a structural schematic diagram of a touch substrate in Embodiment 2 of the present invention.
Figure 2:
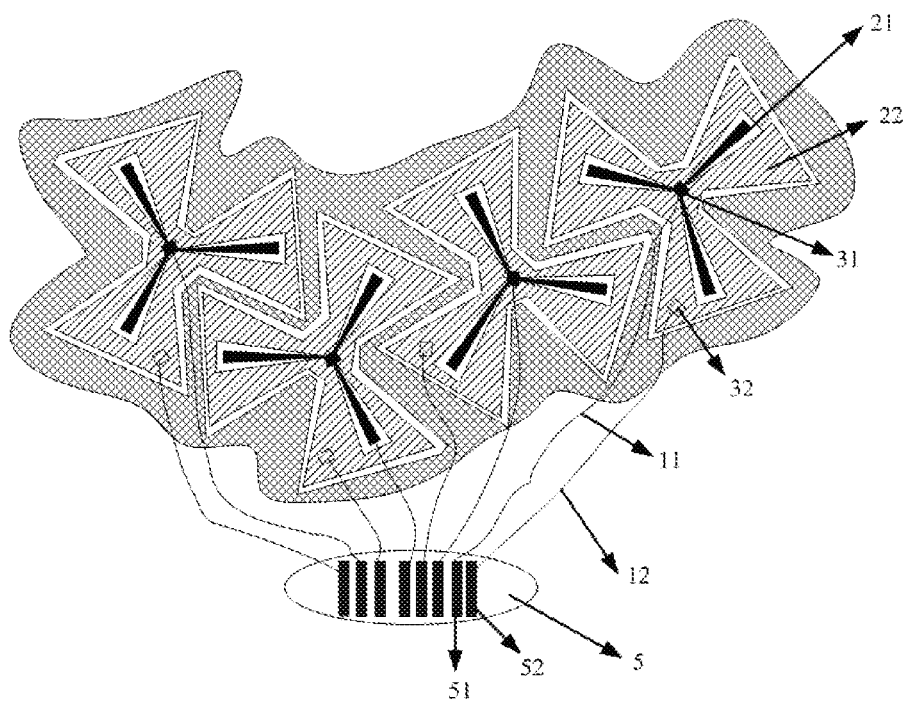
FIG. 2 is a schematic top view of the touch substrate in Embodiment 2 of the present invention.

This embodiment provides a touch substrate, as shown in FIG. 1 and FIG. 2, including:

a base 4;

a first-layer structure 1 arranged on the base 4, wherein the first-layer structure 1 includes first leads 11 and second leads 12 made of graphene, the first leads 14 are connected with first signal ends, and the second leads 112 are connected with second signal ends;

an insulating layer 3 arranged on the first-layer structure 1; and a second-layer structure 2 arranged on the insulating layer, wherein the second-layer structure 2 includes a plurality of touch units made of graphene, each touch unit includes one first pattern 21 and one second pattern 22, wherein each first pattern 21 includes a plurality of branches radiating from the center to the circumference, and each second pattern 22 surrounds one first pattern in a mutually separated manner;

wherein the insulating layer 3 includes a plurality of via holes, wherein a first via hole 31 is formed at a position corresponding to each first pattern 21 and used for connecting the first pattern 21 with the first lead 11, and a second via hole 32 is formed at a position corresponding to each second pattern 22 and used for connecting the second pattern 22 with the second lead 12.

In the touch substrate of this embodiment, the first leads 11 of the first-layer structure I are connected with the first patterns 21 in the second-layer structure 2 through the first via holes 31, the second leads 12 of the first-layer structure 1 are connected with the second patterns 22 in the second-layer structure 2 through the second via holes 32, and a signal transmitting layer is formed by the first patterns 21; and the first patterns 21 and the second patterns 22 produce mutual capacitance therebetween. Each first pattern 21 includes a plurality of branches radiating from the center to the circumference, each second pattern 22 surrounds one first pattern 21 in a mutually separated manner, and when the touch substrate is used for flexible display, the second patterns 22 surrounding the plurality of circumferentially radiated branches of the first patterns 21 can cover the whole bent surface, so that when a user touches any place of the touch substrate, the touch substrate can quickly respond and blind spots cannot be formed. The touch substrate of the present invention is suitable for touch screens in various shapes, in particular for curved surface display or vehicle-mounted field or the like.

Preferably, the first via holes 31 are located in the centers of the first patterns.

Preferably, the first signal ends are signal outputting ends, and the second signal ends are signal sensing ends.

That is to say, a driving IC chip 5 includes first signal ends 51 and second signal ends 52, the first leads 11 connected with the first signal ends output signals to the first patterns 21 in the centers through the first via holes 31, and the second leads 12 connected with the second signal ends sense signals of the second patterns 22 through the second via holes 32. Because the second patterns 22 surround a plurality of circumferentially radiated branches of the first patterns and its area nearly cover all points of the touch substrate, namely the second patterns 22 cover the whole bend surface, so that when a user touches any place of the touch substrate, the touch substrate can quickly respond and blind spots cannot be formed.

Preferably, the touch substrate further includes a flat structure made of graphene located in the second-layer structure 2, wherein the flat structure is located at a position having no first patterns 21 or second patterns 22 and separated from the first patterns 21 and the second patterns 22.

That is to say, as shown in FIG. 2, all shadow areas represent graphene, and blank areas represent graphene-etched parts. In the second-layer structure 2, the parts between the touch units, namely the parts sandwiched by two adjacent touch units are also made of graphene, and the graphene in the parts does not transmit signals, is retained to reduce etching when the graphene in the whole second-layer structure 2 is formed, and can achieve a supporting effect and keep the whole plane flat.

Preferably, the first leads ill and the second leads 12 are at least partially arranged in the flat structure of the second-layer structure.

That is to say, the first leads 11 and the second leads 12 are mainly arranged at the positions between the touch units, so that different signals do not interfere with each other.

Preferably, each second pattern 22 includes protruding portions surrounding the branches of the first pattern 21, and at least part of the protruding portions of the second pattern 22 extend between the protruding portions of the second pattern 22 of the touch unit adjacent thereto.

That is to say, the second patterns 22 of the adjacent touch units are interpose into each other, so that the second patterns 22 sensing signals can cover all positions of the touch substrate.

Preferably, in this embodiment, wherein each first pattern 21 includes three branches radiating from the center to the circumference, thus each second pattern 22 includes three protruding portions surrounding the branches of the first pattern 21, as shown in FIG. 2, but the present invention is not limited thereto. The quantity of the branches of the first patterns 21 and the quantity of the protruding portions of the second patterns can be set according to needs.

Preferably, the widths of the first leads 11 are within the range of 1 μm-3 μm, and the widths of the second leads 12 are within the range of 1 μm-3 μm That is to say, the widths and the lengths of the leads can be designed. according to actual needs, and generally when the widths of the first leads 11 are between 1 μm-3 μm and the widths of the second leads 12 are between 1 μm-3 μm, the requirement of exposure equipment is easily met.

Preferably, the base is made of a flexible material.

That is to say, when the touch substrate is manufactured with a flexible curved surface, a bent base is needed, and the first-layer structure 1, the second-layer structure 2 and the insulating layer 3 are each formed as a curved surface of the same radian.

Preferably, the flexible material includes any of polyethylene terephthalate (PET), polystyrene (PS) and polymethyl methacrylate (PMMA).

Preferably, insulating layer 3 is made of organic carbon.

Embodiment 3

This embodiment provides a manufacturing method of the touch substrate in Embodiment 2, including the following steps.

S1 it, a first-layer structure 1 is formed on a base, wherein the first-layer structure 1 includes first leads 11 and second leads 12 made of graphene.

Preferably, the step of forming first leads 11 and second leads 12 includes: forming first leads 11 and second leads 12 made of graphene by lithography.

That is to say, specifically when the graphene of the first-layer structure 1 is formed, preformed single-layer graphene or double-layer graphene can be transferred to the base by a transfer method. The preformed single-layer or double-layer graphene can be obtained by various methods, e.g., mechanical separation, oxidation reduction or a chemical vapor deposition (CVD). The CVD method mainly includes that hydrocarbon gas such as methane, ethylene and the like is adsorbed onto a surface of a catalyst metal base at a high temperature, and is decomposed and recombined into graphene under the action of metal catalysis. The CVD method is generally performed in a high-temperature furnace, and the grown graphene is completely attached to the catalyst metal after the end of growth. Thus, an additional transfer step is needed for forming the graphene manufactured in such a method on the base. Transfer generally needs that the graphene is soaked into $FeCl_3$ solution for more than ten hours to etch off the catalyst metal base, then fished by using a target base, namely the base of the present invention, and dried to form graphene on the base. Specifically, the method for manufacturing the single-layer or multi-layer graphene and the method for transferring the graphene are both the same as those in the prior art, and therefore are not redundantly described herein. The graphene layer is spin-coated with a photoresist layer covering the graphene layer; and the base spin-coated with the photoresist layer is exposed, developed, etched and peeled to form desired. patterns.

S2, an insulating layer 3 is formed on the base subjected to the above step, and via holes are formed in the insulating layer 3.

S3, a second-layer structure 2 is formed on the base subjected to the above step, wherein the second-layer structure 2 includes a plurality of touch units made of graphene.

Preferably, the step of forming a plurality of touch units includes: forming a plurality of touch units made of graphene by lithography.

That is to say, when a plurality of touch units made of graphene in the second-layer structure 2 are formed, graphene can be injected into the via holes of the insulating layer 3, so that the first leads 11 of the first-layer structure 1 are connected with the first patterns 21 in the second-layer structure 2, and the second leads 12 of the first-layer structure 1 are connected with the second patterns 22 in the second-layer structure 2.

Obviously, many changes can be further made to the specific implementation of each above embodiment; for example, Embodiment 3 is described just by taking as an example that the first leads and the second leads are formed first and then the insulating layer and the touch units are formed successively, but it is also possible to form the touch units first, and then form the insulating layer and the first leads and the second leads of the touch units successively. Moreover, the specific forms of the first patterns 21 and the second patterns 22 of the second-layer structure 2 can be changed according to needs, as long as the patterns cover the whole surface of the touch substrate.

Embodiment 4

This embodiment provides a display device, including any above touch substrate. The display device may be any product or component with a display function, such as a liquid crystal display panel, electronic paper, an OLED panel, a mobile phone, a tablet computer, a television, a display, a notebook computer, a digital photo frame, a navigator or the like.

It could be understood that the foregoing implementations are merely exemplary embodiments adopted for describing the principle of the present invention, but the present invention is not limited thereto. Various variations and improvements may be made for those of ordinary skill in the art without departing from the spirit and essence of the present invention, and these variations and improvements shall also be encompassed within the protection scope of the present invention.

The invention claimed is:

1. A touch substrate, comprising:
a base;
a first-layer structure arranged on the base, wherein the first-layer structure comprises first leads and second leads made of graphene, the first leads being connected with first signal ends, and the second leads being connected with second signal ends;
an insulating layer arranged on the first-layer structure; and
a second-layer structure arranged on the insulating layer, wherein the second-layer structure comprises a plurality of touch units made of graphene, each touch unit comprises one first pattern and one second pattern, wherein each first pattern comprises a plurality of branches radiating from the center to the circumference, and each second pattern surrounds one first pattern in a mutually separated manner;
wherein the insulating layer comprises a plurality of via holes, wherein a first via hole is formed at a position corresponding to each first pattern and used for connecting the first pattern with the first lead, and a second via hole is formed at a position corresponding to each second pattern and used for connecting the second pattern with the second lead, and
wherein the first via holes correspond to the centers of the first patterns.

2. The touch substrate of claim 1, wherein the first signal ends are signal giving ends, and the second signal ends are signal sensing ends.

3. The touch substrate of claim 1, wherein the touch substrate further comprises a flat structure made of graphene located in the second-layer structure, and the flat structure is located at a position having no first patterns or second patterns and separated from the first patterns and the second patterns.

4. The touch substrate of claim 3, wherein the first leads and the second leads are at least partially arranged in the flat structure of the second-layer structure.

5. The touch substrate of claim 1, wherein each second pattern comprises protruding portions surrounding the branches of the first pattern, and at least part of the protruding portions of the second pattern extend between the protruding portions of the second pattern of the touch unit adjacent thereto.

6. The touch substrate of claim 1, wherein the widths of the first leads are within the range of 1 μm-3 μm, and the widths of the second leads are within the range of 1 μm-3 μm.

7. The touch substrate of claim 1, wherein the base is made of a flexible material.

8. The touch substrate of claim 7, wherein the flexible material comprises any of polyethylene terephthalate, polystyrene and polymethyl methacrylate.

9. The touch substrate of claim 1, wherein the insulating layer is made of organic carbon.

10. A manufacturing method of a touch substrate, comprising the following steps:
forming a first-layer structure on a base, wherein the first-layer structure comprises first leads and second leads made of graphene, the first leads being connected with first signal ends, and the second leads being connected with second signal ends;
forming an insulating layer on the first-layer structure;
forming a second-layer structure on the insulating layer, wherein the second-layer structure comprises a plurality of touch units made of graphene, each touch unit comprises one first pattern and one second pattern, wherein each first pattern comprises a plurality of branches radiating from the center to the circumference, and each second pattern surrounds one first pattern in a mutually separated manner;
wherein the insulating layer comprises a plurality of via holes, wherein a first via hole is formed at a position corresponding to each first pattern and used for connecting the first pattern with the first lead, and a second via hole is formed at a position corresponding to each second pattern and used for connecting the second pattern with the second lead, and
wherein the first via holes correspond to the centers of the first patterns.

11. The manufacturing method of the touch substrate of claim 10, wherein the step of forming a first-layer structure further comprises: forming first leads and second leads made of graphene by lithography.

12. The manufacturing method of the touch substrate of claim 10, wherein the step of forming a second-layer structure further comprises: forming a plurality of touch units made of graphene by lithography.

13. A display device, comprising the touch substrate of claim 1.

14. The display device of claim 13, wherein the first signal ends are signal giving ends, and the second signal ends are signal sensing ends.

15. The display device of claim 13, wherein the touch substrate further comprises a flat structure made of graphene located in the second-layer structure, and the flat structure is located at a position having no first patterns or second patterns and separated from the first patterns and the second patterns.

16. The display device of claim 15, wherein the first leads and the second leads are at least partially arranged in the flat structure of the second-layer structure.

17. The display device of claim 13, wherein each second pattern comprises protruding portions surrounding the branches of the first pattern, and at least part of the protruding portions of the second pattern extend between the protruding portions of the second pattern of the touch unit adjacent thereto.

18. The display device of claim 13, wherein the widths of the first leads are within the range of 1 μm-3 μm, and the widths of the second leads are within the range of 1 μm-3 μm.

\* \* \* \* \*